UNITED STATES PATENT OFFICE.

WILLIAM N. BLAKEMAN, JR., OF NEW YORK, N. Y.

PAINT COMPOUND AND PROCESS OF MAKING THE SAME.

No. 883,514.  Specification of Letters Patent.  Patented March 31, 1908.

Application filed February 17, 1906. Serial No. 301,568.

*To all whom it may concern:*

Be it known that I, WILLIAM N. BLAKEMAN, Jr., a citizen of the United States, and resident of the borough of Manhattan, in the city, county, and State of New York, have invented a new and useful Paint Compound and Process of Making the Same, which invention is fully set forth in the following specification.

The object of this invention is to render available for use, as a basis for paint, those pigments which carry no water in combination and were formerly known as anhydrous, but which may be more accurately designated as pigments containing no hydroxyl.

Pigments which contain no hydroxyl do not form satisfactory saponaceous compounds, have very limited spreading power and are slow in drying when ground in an oil-vehicle; and, up to the present time, Dutch process white lead, in consequence of its quick formation of a saponaceous compound—due to the hydrated oxid of lead which it carries in combination—has been regarded as the only white pigment available for use as a sole basis for paint.

I have discovered that by incorporating a hydrated fatty agent with commercial linseed oil, or other fatty oil, a vehicle will be formed for all the neutral primary pigments, or pigments which contain no hydroxyl and are deficient in spreading power, so that when such pigments, if not singly yet in combination, are ground therein, a satisfactory compound will be formed between the pigment and the oil, the paint will spread in a smooth uniform and elastic film, and will dry rapidly—in all physical respects equal to the mixture of Dutch lead in linseed oil.

The hydrated fatty agent may be formed from an oil or fat, such as linseed, tung, or castor oil; a fatty derivative of an oil or fat, such as oleic acid, olein, stearic acid, stearin, or any other equivalent substance. I prefer to employ either linseed oil, or tung oil.

Selecting linseed oil to illustrate my invention, I first hydrate it, and this may be accomplished in several ways. I prefer to place the oil in a vessel suitable for observation, with about one or two per cent. of distilled water distributed on the bottom in as small globules as possible to increase contact area, and then subject it to a heat of about 150° Fahr. The water will soon take on the appearance of encystment, and I use gentle agitation to break up the encystation as fast as it forms, until all the water has been absorbed and combined with the oil which will take from 8 to 10 hours, time depending upon keeping the water in minute contact with the oil by agitation.

Instead of hydrating the oil by heating it in the presence of water, it may be hydrated by exposing it in shallow vessels, with broad surfaces, to the action of air and light; or by suspending the oil, in a suitable vessel, over a body of water, with a covering arranged to retain a vaporous atmosphere in contact with the oil; or by placing the oil in a vessel having about one or two per cent. of water distributed on the bottom, and exposing this vessel to light and agitating the oil at intervals until the water has been absorbed and combined with the oil. These methods however, will be found to be slower and less satisfactory than the method first described, but I wish it to be understood that any suitable method of hydration may be employed. The oil, either before or after hydration, may be oxidized by any suitable method of oxidation, such as by heating it on oxidizers; or by submitting it with heat to the action of pure oxygen under pressure; or by passing through it, with heat, thoroughly dried air; or by incorporating with it any highly oxidized body with which it is miscible, such as boiled linseed oil, manganese resinate, elaidinized oil and the like.

Having formed the hydrated fatty agent, I take from one to two per cent. thereof, raw or oxidized, and incorporate it with commercial linseed oil, or other fatty oil, with which it is miscible. The fluidity of the commercial oil will not be appreciably affected by this incorporation. The vehicle so formed will be found to render available for use, if not singly, yet in combination, all primary pigments which contain no hydroxyl and are deficient in spreading power when ground in oil, such as lead carbonate, lead sulfate, lead sulfite; zinc oxid, zinc sulfid, barium sulfate, barium carbonate, calcium carbonate, strontium sulfate, strontium carbonate, and the various combinations of zinc and lead resulting from furnace sublimation and known commercially as sublimed lead, oxysulfate of lead, zinc-lead, and other trade designations; and a paint compound produced by grinding one or more of these pigments in the vehicle described, will be found satisfactory in all respects. Thus 100 parts of commercial linseed oil, having a hydrated fatty agent combined therewith, as above described, when ground with 240 parts of either lead carbonate, lead sulfate, or sublimed lead, or 100 parts of zinc oxid, or 80 parts each of lead sulfate and zinc oxid, and spread as a paint (with the usual quantity of liquid drier) will follow the brush in a smooth and uniform film, in all physical respects equal to white lead in linseed oil, and will dry it from 3 to 5 hours according to climatic conditions. The pigments may be used either singly or in combination, as my invention gives spreading power to all of them; but, as some of these pigments (the earthy sulfates and carbonates, for example) are deficient in opacity, it will be found advantageous to combine therewith a proportion of zinc oxid. For colored paints, the addition of the colored pigment or pigments will supply the necessary opacity. Any other oil or fat (animal or vegetable) or a fatty derivative of an oil or fat, may be used instead of linseed oil to form the hydrated agent, and be hydrated by any of the methods above described. I have obtained very remarkable results with hydrated tung oil. One per cent. of tung oil, hydrated with from one half to five-eighths of one per cent. of water, or one half of one per cent. of tung oil hydrated with from 1¼ to 1½ per cent. of water, incorporated with fresh linseed oil, will give a beautiful smooth and creamy film, when ground with a pigment or pigments containing no hydroxyl. The tung oil may be hydrated by any of the methods above described for linseed oil, but its behavior under treatment will be found different, as no encystation occurs when it is exposed or heated with water.

The degree of hydration to be imparted to the fatty agent and the proportion of this agent to be incorporated in commercial oil, may be varied in practice and will depend largely upon the character of the pigment with which it is to be used. From one to two per cent. of a fatty agent hydrated with about one per cent. of water will be found sufficient for nearly all the pigments named, although in making some combinations of oxids, carbonates and other salts more may be required, a matter which can be easily regulated in practice. For use with zinc pigments the fatty agent should be hydrated with a slightly larger percentage of water than is necessary for lead pigments, or else a larger percentage of the hydrated fatty agent should be used in the oil-vehicle.

In order to ascertain the degree of hydration necessary for a particular pigment, the film test may be employed. For example: When from one to two per cent. of the fatty agent undergoing hydration is incorporated with 100 parts of commercial linseed oil, and this vehicle is ground with 240 parts of either lead carbonate, lead sulfate or sublimed lead, with the usual quantity of liquid drier, and being spread as a paint, it follows the brush in a smooth homogeneous and uniform film, does not run, crack or craze, and dries in from 3 to 5 hours, the fatty agent may be deemed in a satisfactory state for use as a hydrated agent for the vehicle and pigment used, and the hydration process may be arrested.

In order to produce a more energetic action and increase the spreading power of the compound, the pigment may be treated by combining therewith a hydrated metallic or earthy oxid, such as hydroxid of zinc, or other hydroxid. From 1 to 5 per cent. of hydroxid may be used, depending upon the character of the pigment, a light or bulky pigment requiring a larger percentage than a dense or heavy one. I prefer to use the hydroxid in the form of "slip" or "pulp," attenuating it in water, incorporating it with the pigment, and then evaporating the water; but the hydroxid may be precipitated upon the pigment at its first formation.

It is to be understood that a pigment, or combination of pigments, may be ground to a paste form with from 5 to 7 per cent., or more if necessary, of an oil-vehicle containing a hydrated fatty agent, and this paste afterwards attenuated or extended with commercial oil exactly as "white lead ground in oil" is now known to the trade. Such a paste I do not however herein specifically claim, the same being claimed in my application No. 274,772, filed August 15, 1905.

Two or more hydrated fatty agents may be used if desired, and two or more oils, drying or non-drying, may be combined to form the paint-vehicle. Any suitable drier, such as linseed, tung, or other drying oil, or a commercial liquid drier, may be added to the paint. Heat, pressure and agitation may be employed whenever deemed advisable.

I do not herein claim, by itself, the oil-vehicle herein described, the same being claimed in my application No. 242,505, filed January 24, 1905.

Having thus fully described my invention, I claim:

1. A compound or mixture of a fatty oil; a hydrated fatty agent; and a pigment which contains no hydroxyl and is deficient in spreading power.

2. A compound or mixture of a fatty oil; a hydrated oil; and a pigment which contains no hydroxyl and is deficient in spreading power.

3. A compound or mixture of an oil; hydrated tung oil; and a pigment which contains no hydroxyl and is deficient in spreading power.

4. A compound or mixture of linseed oil; hydrated tung oil; and a pigment which contains no hydroxyl and is deficient in spreading power.

5. The process herein described which consists in incorporating a hydrated fatty agent with a fatty oil, and then grinding therein a pigment which contains no hydroxyl and is deficient in spreading power.

WM. N. BLAKEMAN, JR.

Witnesses:
FRANCIS P. REILLY,
MABEL O. FAHNESTOCK.